United States Patent
Byrne et al.

(10) Patent No.: US 9,154,498 B2
(45) Date of Patent: Oct. 6, 2015

(54) SHARABLE CONTENT ITEM LINKS WITH USE RESTRICTIONS

(71) Applicant: Dropbox, Inc., San Francisco, CA (US)

(72) Inventors: Sean Byrne, Oakland, CA (US); Todd Dabney, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/281,347

(22) Filed: May 19, 2014

(65) Prior Publication Data

US 2014/0289868 A1 Sep. 25, 2014

Related U.S. Application Data

(63) Continuation of application No. 13/848,853, filed on Mar. 22, 2013, now Pat. No. 8,732,853.

(51) Int. Cl.
*H04L 29/00* (2006.01)
*H04L 29/06* (2006.01)
*H04L 29/08* (2006.01)

(52) U.S. Cl.
CPC ........ *H04L 63/083* (2013.01); *H04L 29/06809* (2013.01); *H04L 63/08* (2013.01); *H04L 63/0838* (2013.01); *H04L 67/02* (2013.01); *H04L 63/168* (2013.01); *H04L 2463/082* (2013.01)

(58) Field of Classification Search
CPC ............... H04L 63/0838; H04L 63/08; H04L 29/06809; H04L 63/083; H04L 67/02; H04L 63/168
USPC .......................................................... 726/28
See application file for complete search history.

(56) References Cited

U.S. PATENT DOCUMENTS

| | | |
|---|---|---|
| 6,192,407 B1 | 2/2001 | Smith et al. |
| 7,266,585 B2 | 9/2007 | Kay et al. |
| 2001/0002485 A1 | 5/2001 | Bisbee et al. |
| 2001/0028363 A1 | 10/2001 | Nomoto et al. |
| 2003/0120680 A1 | 6/2003 | Agrawal et al. |
| 2006/0123011 A1 | 6/2006 | Stillion et al. |
| 2007/0033397 A1 | 2/2007 | Phillips, II et al. |
| 2007/0233519 A1 | 10/2007 | Lorsch |
| 2007/0258108 A1 | 11/2007 | Matsumoto et al. |

(Continued)

OTHER PUBLICATIONS

Flickr: Use Guest Pass to Share with Non-Flickr Friends, <http://www.techrecipes.com/rx/2726/flickr_use_guest_pass_share>, dated Jan. 8, 2008, 2 pages.

(Continued)

*Primary Examiner* — Michael Pyzocha
(74) *Attorney, Agent, or Firm* — Hickman Palermo Becker Bingham LLP; Adam C. Stone

(57) ABSTRACT

Shareable content items links with use restrictions. In one embodiment, for example, a method comprises: receiving, from a client computing device used by a link submitter, a request to access a server-stored content item at a sharable link; denying the access requested by the link submitter based on one or more use restrictions associated with the shareable link; prompting the link submitter to request approval to access to the server-stored content item at the shareable link; responsive to receiving approval for the link submitter to access the server-stored content item at the shareable link, modifying the use restrictions associated with the shareable link to allow the link submitter to access the server-stored content item at the shareable link.

20 Claims, 15 Drawing Sheets

(56) References Cited

U.S. PATENT DOCUMENTS

| | | |
|---|---|---|
| 2007/0288637 A1 | 12/2007 | Layton et al. |
| 2008/0115227 A1* | 5/2008 | Toutonghi ............... 726/29 |
| 2008/0201254 A1 | 8/2008 | Sharma et al. |
| 2008/0320397 A1 | 12/2008 | Do et al. |
| 2009/0089882 A1* | 4/2009 | Hofmann et al. ........... 726/28 |
| 2010/0011448 A1* | 1/2010 | Wagner ................. 726/27 |
| 2010/0205196 A1 | 8/2010 | Schreiber et al. |
| 2012/0066277 A1 | 3/2012 | Ubukata et al. |
| 2012/0110632 A1 | 5/2012 | Burghart |
| 2012/0130837 A1 | 5/2012 | Tinsley et al. |
| 2012/0169460 A1 | 7/2012 | Thumparthy |
| 2012/0173881 A1* | 7/2012 | Trotter et al. ............ 713/189 |
| 2012/0331529 A1 | 12/2012 | Ibel et al. |
| 2013/0061335 A1 | 3/2013 | Schwabe |
| 2013/0067594 A1* | 3/2013 | Kantor et al. ............. 726/28 |
| 2013/0268552 A1* | 10/2013 | Platt et al. ............... 707/769 |
| 2014/0101434 A1* | 4/2014 | Senthurpandi et al. ...... 713/150 |
| 2014/0123237 A1* | 5/2014 | Gaudet et al. .............. 726/4 |
| 2014/0215568 A1* | 7/2014 | Kirigin et al. .............. 726/4 |
| 2014/0289839 A1* | 9/2014 | Chen et al. ................ 726/9 |

OTHER PUBLICATIONS

Box, Box.net End User Guide, publically avaiable prior to Dec. 12, 2011, 20 pages.

U.S. Appl. No. 13/848,853, filed Mar. 22, 2013, Notice of Allowance, Jan. 24, 2014.

U.S. Appl. No. 13/848,853, filed Mar. 22, 2013, Office Action, Sep. 4, 2013.

U.S. Appl. No. 14/281,337, filed May 19, 2014.

U.S. Appl. No. 14/281,337, filed May 19, 2014, Office Action, Nov. 24, 2014.

* cited by examiner

Dropbox /                                                          John Doe

| Name ^ | Kind | Modified |
|---|---|---|
| Some folder | Folder | -- |
| Some document | Document <type> | 10/25/2011 11:42 PM |
| Some music | Audio <type> | 10/26/2011 7:20 PM |
| Some video | Video <type> | 12/28/2012 10:36 AM |
| Some image | Image <type> | 3/8/2012 4:29 PM |

FIG. 3

Dropbox /                                                                    John Doe Some folder [Invite to Folder] [Share Link] [Download] [Delete] [Rename] [Move] [Copy]

| Some folder | Folder | -- |
|---|---|---|
| Some document | Document <type> | 10/25/2011 11:42 PM |
| Some music | Audio <type> | 10/26/2011 7:20 PM |
| Some video | Video <type> | 12/28/2012 10:36 AM |
| Some image | Image <type> | 3/8/2012 4:29 PM |

Share "Some document"  [Email] [FACEBOOK] [TWITTER]

Add Names or Emails  [jane.doe@soemcompany.com; jsmith@someothercompany.com ]

Message  [                                          ]

▶ Restrict access

Authenticated Users: jane.doe@soemcompany.com; jsmith@someothercompany.com

Type of Access: [View and Download ^]

When: ▶ Anytime or From: [            ] To [            ]

How Often: ▶ Unlimited or [    ] Times

Two-Level Authentication Required: ● Yes ○ No

Location: [                ]

Everyone else:

Type of Access: [None ^]

When: ▶ Anytime or From: [            ] To [            ]

Location: [                ]

[Share]    [Get Link]

Share "Some document"                              [Email]   [FACEBOOK]   [TWITTER]

Add Names or Emails   [ sally.ceo@company.com; jcfo@company.com ]

Message   [                                                                      ]

☑ Restrict access
_____

Team Members:  sally.ceo@company.com; jcfo@company.com

Type of Access: [View and Download ^]

When:  ☑ Anytime or From: [           ] To [           ]

How Often: ☑ Unlimited or [    ] Times

Two-Level Authentication Required:  ● Yes   ○ No

Location: [                          ]

_____

[Share]                 [Get Link]

Share "Some document"      [Email] [FACEBOOK] [TWITTER]

Add Names or Emails   [sally.ceo@company.com; jcfo@company.com ]

Message [                      ]

▸ Restrict access
_____

Team Members: sally.ceo@company.com; jcfo@company.com

Type of Access: [View and Download ^]

When: ▸ Anytime or From: [     ] To [     ]

How Often: ▸ Unlimited or [   ] Times

Two-Level Authentication Required: ● Yes   ○ No

Location: [        ]

Non-Team Members (i.e., everyone else):

Type of Access: [None ^]

When: ▸ Anytime or From: [     ] To [     ]

Location: [        ]
_____

[Share]           [Get Link]

You are not authorized to access "Some Document".

Would you like to request access to the content item from the person who shared the link?

[Yes]    [No]

FIG. 10

John Doe has requested access to "Some Document".

Add John Doe to the list of authorized users for this [sharable link]?

[Yes]   [No]

Restrictions for "https://www.dropbox.com/s/bx7f9psdfslg7qzg/Some%20document"

Content item: Some document

Authenticated Users: jane.doe@soemcompany.com; jsmith@someothercompany.com

Type of Access: [View and Download ^]

When: ✓ Anytime or From: [          ] To [          ]

How Often: ✓ Unlimited or [     ] Times

Two-Level Authentication Required: ● Yes  ○ No

Location: [          ]

Everyone else:

Type of Access: [None ^]

When: ✓ Anytime or From: [          ] To [          ]

Location: [          ]

[Save]  [Cancel]

FIG. 13

| Name ^ | Created | | John Doe |
|---|---|---|---|
| Some folder | 10/26/2011 7:20 PM | [Restrict Access] | |
| Some document | 12/28/2012 10:36 AM | [Edit Restrictions] | [Delete] |
| Some music | 12/28/2012 10:36 AM | [Edit Restrictions] | [Delete] |
| Some video | 12/28/2012 10:36 AM | [Edit Restrictions] | [Delete] |

SHARABLE CONTENT ITEM LINKS WITH USE RESTRICTIONS

CROSS-REFERENCE TO RELATED APPLICATIONS; BENEFIT CLAIM

This application is a Continuation of U.S. patent application Ser. No. 13/848,853, filed Mar. 22, 2013, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to sharing digital content and, more specifically, to sharing digital content with sharable content item links having use restrictions.

BACKGROUND

Traditionally, users have shared digital content (e.g., a document, a digital audio file, a digital video file, a digital image file, or other digital information) with each other by hand carrying or otherwise transporting portable physical media such as floppy disks between computers. In recent years, data networks that interconnect computers allow users to send digital content to each other over the networks without having to transport physical media. For example, one user can send a file to another user as an attachment to an e-mail message.

Today, in addition to traditional methods, users share digital content by making it available for download from servers. For example, a user may upload digital content to a server. Another user may download the digital content from the server. However, once the digital content is uploaded to the web server, the sharing user may have little or no control over how the digital content is accessed at the server. For example, the sharing user may not be able not be able to prevent the public at large from downloading the digital content from the server while at the same allowing certain authorized users to download the digital content from the server.

Given the need of sharing users to place restrictions on how digital content at servers is accessed, there is a need for easy-to-use solutions for sharing digital content between users that allowing sharing users to restrict how shared digital content is accessed. The present invention fulfills this and other needs.

SUMMARY

The claims section at the end of this document provides a useful summary of some embodiments of the present invention.

BRIEF DESCRIPTION OF THE DRAWINGS

FIG. 2 is a diagram illustrating a log-in form, which is displayed whenever a user needs to log in.

FIG. 3 is a diagram illustrating a content item browser page.

FIG. 4 is a diagram illustrating a content item browser page when a folder content item is selected for further action.

FIG. 7 is a diagram illustrating a form for sharing a content item as a sharable link and for specifying restrictions on use of the sharable link for access to the content item.

FIG. 8 is a diagram illustrating a form for sharing a content item as a sharable link and for specifying restrictions on use of the sharable link for access to the content item.

FIG. 9 is a diagram illustrating a form for sharing a content item as a sharable link and for specifying restrictions on use of the sharable link for access to the content item.

FIG. 10 is a diagram illustrating an unauthorized access form presented to a Link Submitter for requesting access to a content item at a sharable link from a Link Sharer.

FIG. 11 is a diagram illustrating a form presented to a Link Sharer for approving or denying a request to access to a content item at a sharable link from a Link Submitter.

FIG. 12 a diagram illustrating a form presented to a Link Sharer for modifying the use restrictions on a sharable link for a content item that an unauthorized Authenticated User has requested access to.

FIG. 13 a diagram illustrating a page for managing sharable links that a Link Sharer has previously shared.

DETAILED DESCRIPTION

Figure 1:
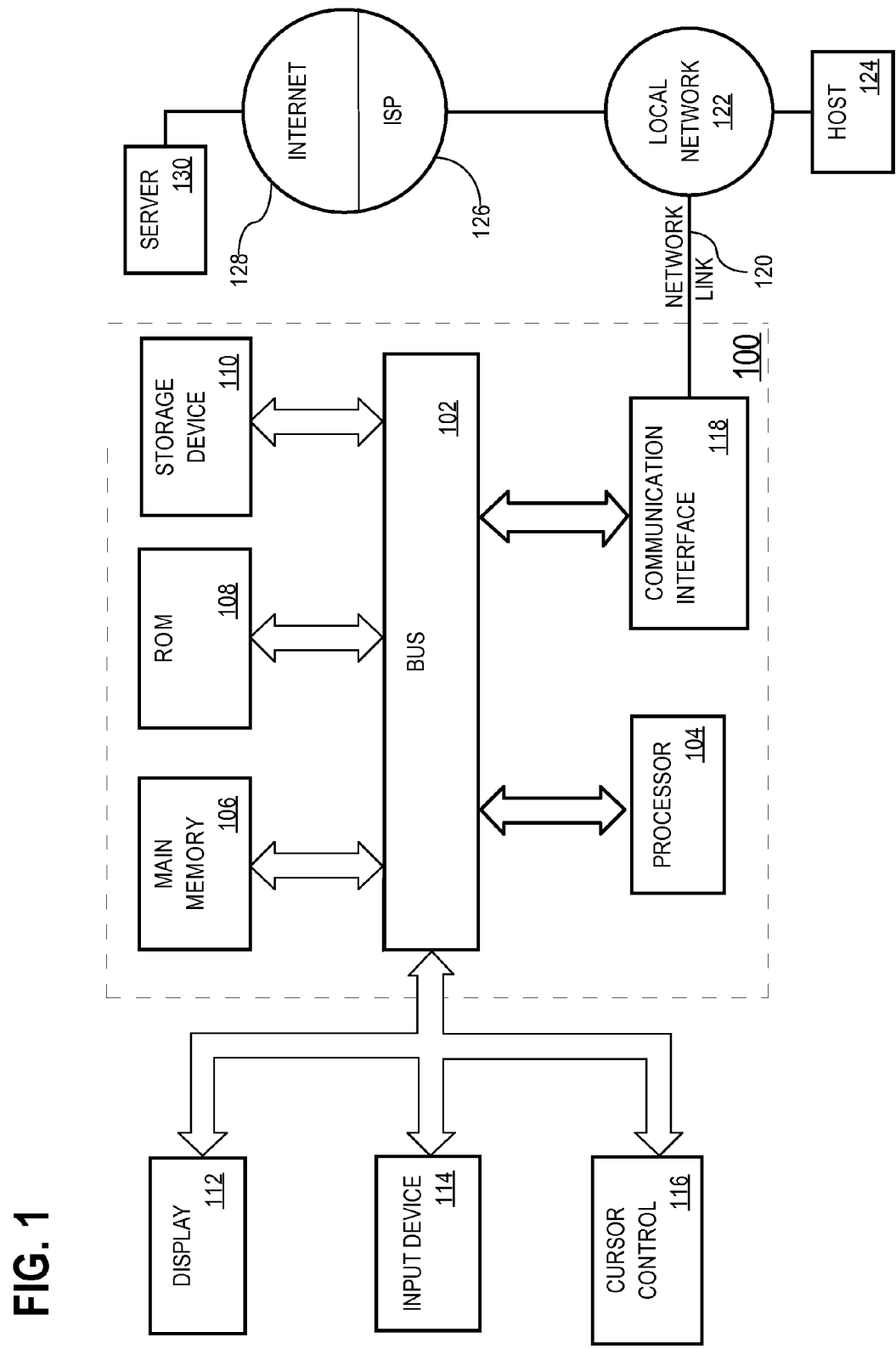
FIG. 1 is a very general block diagram of a computer system in which software-implemented processes of the present invention may be embodied.

Referring to the figures, exemplary embodiments of the invention will now be described. The following description will focus on a presently preferred embodiment of the present invention, which implemented in personal, portable, and/or server software operating an Internet-connected environment running under an operating system, such as the Microsoft Windows operating system or a Unix-based operating system. The present invention, however, is not limited to any one particular application or any particular environment. Instead, those skilled in the art will find that the system and methods of the present invention may be advantageously embodied on a variety of different platforms. Therefore, the description of the exemplary embodiments that follows is for purposes of illustration and not limitation. The exemplary embodiments are primarily described with reference to block diagrams or flowcharts. As to the flowcharts, each block within the flowchart represents both a method step and an apparatus element for performing the method step. Depending on the implementation, the corresponding apparatus element may be configured in hardware, software, firmware, or combinations thereof.

Overview of Disclosed Embodiments

A computer-implemented system providing web-based sharable content item links with link sharer specified use restrictions on accessing an underlying sever-stored content item is described. In one embodiment, for example, a computer-implemented method of the present invention for restricting use of a sharable link for access to a server-stored content item includes the steps of: receiving, from a client computing device used by a link sharer, a request to share a server-stored content item as a sharable link; causing a user interface to be presented at the client computing device of the link sharer that allows the link sharer to specify one or more restrictions on how the sharable link is used to access to the server-stored content item; receiving, from the client computing device used by the link sharer and through the user interface presented at the client computing device, a specification of at least one of the restrictions; receiving, from a client computing device used by a link submitter, a request to access the server-stored content item at the sharable link; determining whether the at least one restriction prevents the link submitter from the requested access to the server-stored content item; and granting the requested access only after determining that the at least one restriction does not prevent the link submitter from the requested access.

In another embodiment, for example, a system of the present invention is described for restricting use of a sharable link for access to a server-stored content item. The system comprises a user interface manager for: receiving, from a client computing device used by a link sharer, a request to share a server-stored content item as a sharable link; causing a user interface to be presented at the client computing device of the link sharer that allows the link sharer to specify one or more restrictions on how the sharable link is used to access to the server-stored content item; receiving, from the client computing device used by the link sharer and through the user interface presented at the client computing device, a specification of at least one of the restrictions; and receiving, from a client computing device used by a link submitter, a request to access the server-stored content item at the sharable link. The system further comprises a content item sharing manager for: determining whether the at least one restriction prevents the link submitter from the requested access to the server-stored content item; and granting the requested access only after determining that the at least one restriction does not prevent the link submitter from the requested access.

Computer-Based Implementation

The computer-implemented techniques of the present invention may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer system, server computer systems, portable computer systems, handheld electronic devices, networking devices or any other computing device that incorporates hard-wired and/or program logic to implement the techniques.

For example, FIG. 1 is a block diagram that illustrates a computer system 100 upon which an embodiment of the invention can be implemented. Computer system 100 includes a bus 102 or other communication mechanism for communicating information, and a hardware processor 104 coupled with bus 102 for processing information. Hardware processor 104 can be, for example, a general purpose microprocessor. Although only one hardware processor 104 is shown in FIG. 1, computer system 100 can have more than one hardware processor 104 coupled to bus 102 for processing information.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 can be coupled via bus 102 to a display 112, such as a liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

A touch-sensitive surface can overlay display 112 as an input device 114 to form a touch-sensitive display that provides an input interface and an output interface between the system 100 and a user. The touch-sensitive surface can be a sensor or set of sensors that accepts input from the user based on haptic and/or tactile contact. Contact with the touch-sensitive surface can be made by the user with a stylus or set of styluses or a finger or a set of fingers. The touch-sensitive surface can detect contact and any movement or breaking thereof using any of a plurality of touch sensing techniques now known or later developed including, but not limited to, capacitive, resistive, infrared, and acoustic wave techniques, as well as other proximity sensor arrays or other elements for detecting one or more points of contact, movement of contact, and breaking of contact with the touch-sensitive surface.

Although display 112, input device 114, and cursor control 116 are illustrated outside the dashed box representing computer system 100 in FIG. 1, it should be understood that one or more of display 112, input device 114, and cursor control 116 can be part of the form factor of the computer system 100. For that matter, although main memory 106, ROM 108, storage device 110, bus 102, processor 104, and communication interface 118 are illustrated inside the dashed box representing computer system 100, it should be understood that one or more of these components can be external to the form factor of the computer system 100 and operatively coupled to the form factor through a peripheral interface.

Computer system 100 can implement the techniques described herein using customized hard-wired logic, one or more ASICs or FPGAs, firmware and/or program logic which, in combination with the computer system, causes or programs computer system 100 to be a special-purpose machine. According to one embodiment, the techniques herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 110, or other non-volatile storage for later execution.

The above-described computer hardware are presented for purposes of illustrating the basic underlying desktop, portable, and server computer components that can be employed for implementing the present invention. For purposes of discussion, the following description will present example in which it will be assume that there exists a "server" (e.g., a web server, capable of hosting methods of the present invention as web services) that communicates with one or more "clients" (e.g., desktop or portable computers, from which users log on to the server in order to use the web services). The present invention, however, is not limited to any particular environment or device configuration. In particular, a client/server distinction is not necessary to the invention, but is simply a suggested framework for implementing the present invention. Instead, the present invention can be implemented in any type of system architecture or processing environment capable of supporting the methodologies of the present invention presented in detail below, including implementing the methodologies on a standalone computer (i.e., where users long on to the same computer that the computer-implemented methodologies are services). Additionally, the following description will focus on file hosting service providers (e.g., Dropbox, Inc. of San Francisco, Calif., which provides cloud storage, file synchronization, and client software to users) in order to simply the discussion. However, those skilled in the art will appreciate that the system and methodologies of the present invention can be advantageously applied to sharing all types of digital content.

Shareable Content Item Links

According to some embodiments, the present invention provides system and methods supporting sharable content item links (sharable links) for sharing digital content items (content items) between users. The system and methods also provide the ability to the Link Sharer to specify certain restrictions on how sharable links are used to access shared content items.

Content Items

A content item is a logical collection of digital content. Digital content can include, but is not limited to, text, animations, audio, graphics, images, or some combination thereof. Content items can include, but are not limited to, files and folders. Files can include, but are not limited to, digital documents (e.g., .DOC, .PDF, .XLS, .TXT, and other document file types), digital audio files (e.g., .WAV, .M4A, .MP3, .AAC, and other digital audio file types), digital video files (e.g., .AVI, .MOV, .MP4, and other video file types) and digital image file (e.g., .JPEG, .TIFF, GIF, PNG, and other image file types). A folder is a named logical collection of one or more files and/or one or more folders.

Users

At the outset, it is helpful to understand different users of the system. At the highest level, there are two main categories of users: Authenticated Users and Public Users.

Authenticated Users—Overview

Authenticated Users are users of the system having an individual identity known to the system. The system can establish the identity of the user by successfully authenticating the user based on a valid username and password provided by the user. Other manners of authenticating the user are possible and the present invention is not limited to any particular manner of user authentication. For example, authentication of the user can be based on a valid cryptographic digital certificate presented by the user.

An Authenticated User has an account with the system and a set of zero or more content items associated with the account and stored on the system's servers. At the highest level, there are two different types of accounts that users can authenticate with: Individual and Team.

An Individual Account is an account where at least some of the content items associated with the account are associated with only that account and not any other accounts.

A Team Account is an account in which the content items associated with the account are also associated with one or more other Team Accounts. The set of Team Accounts associated with the same set of contents items are collectively referred to as a "Team". Teams allow a group of Authenticated Users to collaborate on a set of content items. A user that successfully authenticates with one of the Team Accounts, as well as being an Authenticated User, can be referred to as a member of the team (or just "Team Member").

In this description, the term "Authenticated User", unless otherwise apparent in context, is used to refer to both users that successfully authenticate with an Individual Account and users that successfully authenticate with a Team Account. Where description applies only to Team Accounts and not Individual Accounts, the term "Team Member" is used to refer to an Authenticated User that has successfully authenticated with a Team Account. Where description applies only to Individual Accounts and not Team Accounts, the term "Individual User" is used to refer to an Authenticated User that has successfully authenticated with an Individual Account.

Public Users

Public Users are users of the system who individual identity is unknown to the system. Public Users can be unauthenticated users of the system. Nonetheless, the system can acquire some identifying information about the Public Users such as the peer network addresses (e.g., IP addresses) of the computing devices from which the Public Users communicate with the system over a network.

Authenticated Users—Identity and Notification

An Authenticated User can be identified by and to the system through an account identifier. The account identifier can be, for example, an e-mail address provided to the system by the Authenticated User. For example, the Authenticated User can provide an e-mail address when registering for an account with the system. Thus, the Authenticated User's account identifier can correspond to the Authenticated User's username, if the system authenticates users by username and password. As another example, the account identifier can be the subject or the common name portion thereof of the Authenticated User's public key certificate, if the system authenticates users by digital certificates.

Whether or not the account identifier is an e-mail address, the Authenticated User's account can have an e-mail address associated with it for use by the system in sending e-mail notifications to the Authenticated User. That e-mail address can be the account identifier, if the account identifier is an e-mail address. If the account identifier is not an e-mail address, then the Authenticated User can provide a notification e-mail address to the system, for example, as part of the account registration process.

Authenticated Users can also have other notification "addresses" that the system uses for sending other types of notifications to the Authenticated Users. For example, an Authenticated User's account can have a phone number that the system uses to send text message notifications (e.g., Short Message Service (SMS) messages) to the Authenticated User.

Authenticated Users—Sharing Links with Restrictions

During system use, Authenticated Users are presented with a Content Item Browser that allows them to browse the set of content items associated with their accounts. From this browser, Authenticated Users can select content items to share in the form of sharable links to the content items. The sharable link can be a URL generated by the system. The sharable link can be unique for the shared content item and may be generated in such a way that it is difficult to guess the sharable link. Among other information, the sharable link can contain a difficult to guess pseudo-randomly generated set of characters and an identifier of the shared content item (e.g., the name of the shared content item). Thus, even if the random characters were guessed correctly, the sharable link could not be reproduced unless the identifier of the content item is known or also guessed correctly. For example, if the shared content item is a file named "Getting Started.pdf", the system can generate the following sharable link:

https://www.dropbox.com/s/bx7f9 pmqblg7qzg/ Getting%20Started.pdf In this example, the character sequence "bx7f9 pmqblg7qzg" is the pseudo-randomly generated set of characters and the character sequence "Getting %20Started.pdf" is the identifier of the content item (the character sequence "%20" is used to encode the space between "Getting" and "Started" in the URL which by standard is not permitted to contain space characters). Other sharable link formats are possible and the present invention is not limited to any particular sharable link format. For example, the sharable link can contain only a pseudo-randomly generated set of characters instead of both a pseudo-randomly generated set of characters and an identifier of the shared content item.

URL is an abbreviation of Uniform Resource Locator, a character string with a specific syntax for addressing and accessing a resource on a network. The first part of the character string indicates what network protocol to use to access the resource (e.g., "http" or https"), followed by a colon and two forward slashes. The second part of the string specifies an IP address or a domain name where the resource is located on the network. The optional third part of the string indicates a location-specific path to the resource. The third part may also contain application-specific data (e.g., a query string) and subordinate resource identifying information (e.g., a fragment identifier).

Once Authenticated Users select a content item to share through the Content Item Browser, the Authenticated Users can specify one or more Link Recipients to which the system will send notification of the sharable link generated for the shared content item. For example, the system can send an e-mail message and/or a text message containing the sharable link to each of the specified Link Recipients.

The Authenticated Users can also specify a third-party web service with which the Authenticated Users have separate accounts and to which the system will provide the sharable link for further action by the third-party web service. For example, the third-party web service can be FACEBOOK (www.facebook.com) and the sharable link can be posted on the Authenticated User's FACEBOOK WALL. As another example, the third-party web service can be TWITTER (www.twitter.com) and the sharable link can be sent in a TWEET from the Authenticated User's TWITTER ACCOUNT.

Authenticated Users can also specify one or more restrictions on how sharable links are used to access shared content items. The restrictions can be specified in the context of selecting a particular content item for sharing as a sharable link generated by the service. The restrictions can include user restrictions. In particular, the restrictions can include which Authenticated Users are permitted to access the particular content item using the sharable link, if the particular content item is associated with an Individual Account. If the particular content item is associated with a Team Account, the restrictions can include which Team Members are permitted to access the particular content item using the sharable link.

The restrictions can also include restrictions on the manner of access to the particular content item using the sharable link. The manner of access restrictions can include what type of access is permitted, when access is permitted, from where access is permitted, how many times access is permitted, among other possible manner of access restrictions. For example, the restrictions associated with the sharable link can specify that everyone may see a preview of the particular content item but that only specified Authenticated Users may view the particular content item and download a copy of the particular content item.

For the purpose of providing clear examples, an Authenticated User that selects a content item for sharing as a sharable link generated by the system is referred to herein as a "Link Sharer". A user that receives a generated sharable link in a notification (e.g., an e-mail message or a text message) sent by the system is referred to herein as a "Link Recipient". A user that submits a sharable link to the system requesting the system to perform an action on the content item associated with the sharable link is referred to herein as a "Link Submitter".

Note that a Link Submitter may not be a Link Recipient if the Link Submitter obtained the sharable link by other than a notification sent by the system. For example, a Link Recipient may have shared the sharable link with a non-Link Recipient who then submits the sharable link to the system attempting to gain access to the content item. The present invention allows the Link Sharer to specify user restrictions on the sharable link so that only users authorized by the Link Sharer are permitted to gain access to the content item using the sharable link. Further, the present invention allows the Link Sharer to specify manner of access restrictions so that the authorized users gain access to the content item only in ways authorized by the Link Sharer.

Application Access

As mentioned previously, each account with the system has a set of content items associated with it that are stored on the system's servers. The set of content items can be presented to Authenticated Users as a file-folder hierarchy. The hierarchy has a single top-level folder which can be unnamed. Each content item in the set has a path in the hierarchy relative to the top-level folder. The hierarchical path to the content item has one or more path components. Each path component corresponds to a file or a folder along the path to the content item. If there is only one path component, then the one path component corresponds to a file or folder in the top-level folder. Since only folders may contain other content items, if there is more than one path component in the path, then all but the leaf path component must correspond to folders in the hierarchy along the path. The leaf path component can correspond to a file or folder. For example, the path "/Some Document.pdf" can refer to a PDF file in the top-level folder while the path "/Some Folder1/Some Folder2/Some Document.txt" can refer to a text document stored in a first folder that is a sub-folder of a second folder that, in turn, is a sub-folder of the top-level folder. In these examples, the forward slash character ('/') is arbitrarily selected to separate path component names in the textual description of the paths.

The application can be accessed via a general login at www.dropbox.com/login. This is a generic login page that takes the user to the Content Item Browser after they sign in. For Individual Users, the system automatically directs them to the top-level folder of the set of content items associated with their Individual Account. For Team Members, the system automatically directs them to the top-level folder of the set of content items of the Team.

Login

Figure 2:
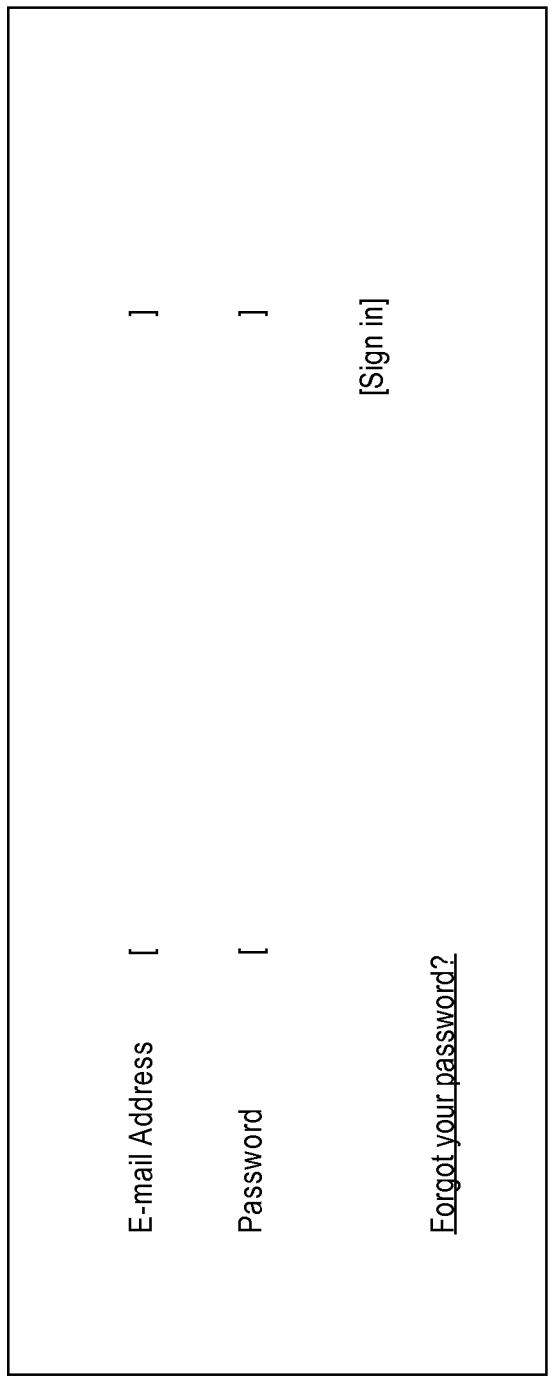

FIG. 2 is a diagram illustrating a log-in form or page, which is displayed whenever a user needs to log in to an account held by the system. Following a successful login, the Authenticated User is taken to the page he or she originally attempted to access (or the Content Item Browser if no page was specified).

If the Authenticated User is attempting to access a page corresponding to a sharable link (i.e., the Authenticated User is a Link Submitter) and the Authenticated User does not have permission to access the page according to the restrictions specified by the Link Sharer, then appropriate text may be displayed such as "Requested Access Not Allowed". In some usage scenarios, as described in greater detail below, in addition to presenting the requested access not allowed message, the Authenticated User is presented with user interface controls for requesting access to the content item. The request is sent to the Link Sharer who can then approve or disapprove the request. If the request is approved, the system sends a notification to the Authenticated User informing of the approved access. Once approved by the Link Sharer, the Authenticated User can access the content item using the sharable link.

If the Link Submitter is a Public User and the Public User does not have permission to access the page according to the restrictions specified by the Link Sharer, then the requested access not allowed message can also be displayed. In addition, a link to the log-in page can be displayed so that if the Public User has an account with the system the Public User can attempt to access the page as an Authenticated User.

If the user is logging in through the www.dropbox.com/login page, he or she will be directed to the Content Item Browser.

The "Forgot your password?" link takes the user to a recover password form (not shown).

Content Item Browser

FIG. 3 is a diagram illustrating a Content Item Browser page. In some embodiments, the Content Item Browser provides an interactive file-folder hierarchy view of the set of content items associated with an account. However, presenting the set of content items associated with the account as a file-folder hierarchy is not required and the set of content items can be presented in other ways in other embodiments. As shown, the page displays the Authenticated User's name (e.g., John Doe). If the account is a Team Account, the page can also display the Team's name (not shown).

The page displays content items for a current folder in hierarchy. The current folder is indicated on the page. In this example, the current folder is the top-level folder. Accordingly, the current folder is indicated as "/" on the page (next to the service name "Dropbox"). Indicators other than the forward slash character can be used to separate path components. For example, the indicator cane be another character (e.g., '>') or a graphic or icon.

The content items contained in the current folder are presented on the page in a table below the current path indicator. The table has three displayed columns: a name column, a kind column, and a modified column. The names of the columns are indicated in the first row of the table. The second and subsequent rows of the table correspond to content items in the current folder. The name column contains the names of the content items in the current folder. The kind column indicates the type of the content items in the current folder. The modified column contains a date of last modification of the content items in the current folder. While five content items are shown in FIG. 3, it should be understood that a folder can contain more or less than five content items.

The name of each content item is a link which when activated by the Authenticated User takes the Authenticated User to another page pertaining to the content item. Activation can occur by a point and click of a pointing device (e.g., a mouse) on the name link or by touch contact on the display area of the name link, as just two examples. If the selected content item is a folder, then the Authenticated User is taken to another Content Item Browser page listing the content items in the selected folder. The selected folder is now the current folder. If the selected content item is a file, then the Authenticated User is taken to a page that presents the results of performing an action on the content item. For example, the page may present a preview of the file or the system may serve a copy of the file for download to the Authenticated User's computing device. However, the action performed on the file is not limited to any particular action and actions other than generated a preview and serving the file for download can be performed by the system.

The kind of each content item in the kind column indicates the type of the content file. Generally, the kind indicates whether the content item is a file or folder and if a file, what type of file (e.g., document, image, video, audio, etc.).

The modified date of each content item in the modified column indicates when the content item was last modified. For folders or files for which modification date information is non-applicable or unavailable, a not-applicable or unavailable indicator (e.g., "--") can be displayed in the modified column.

Selecting a Content Item in the Content Item Browser for Sharing

FIG. 4 is a diagram illustrating the Content Item Browser page when a listed folder content item is selected for further action by the Authenticated User. The listed folder can be selected by the Authenticated User by activating the row of the content item listing table in which the folder is listed. Once selected, the selected listed folder can be visually highlighted on the page. In the example, the highlighting is accomplished by indicating the border of the selected row in the table. However, the selected folder can be visually highlighted in virtually any way that indicates the selected folder.

Once selected, a number of actions on the selected folder can be taken by the Authenticated User. The available actions can be displayed on the page in response to selection of a folder. As shown, one of the actions can be an action to share the selected folder with a sharable link generated by the system.

Figure 5:
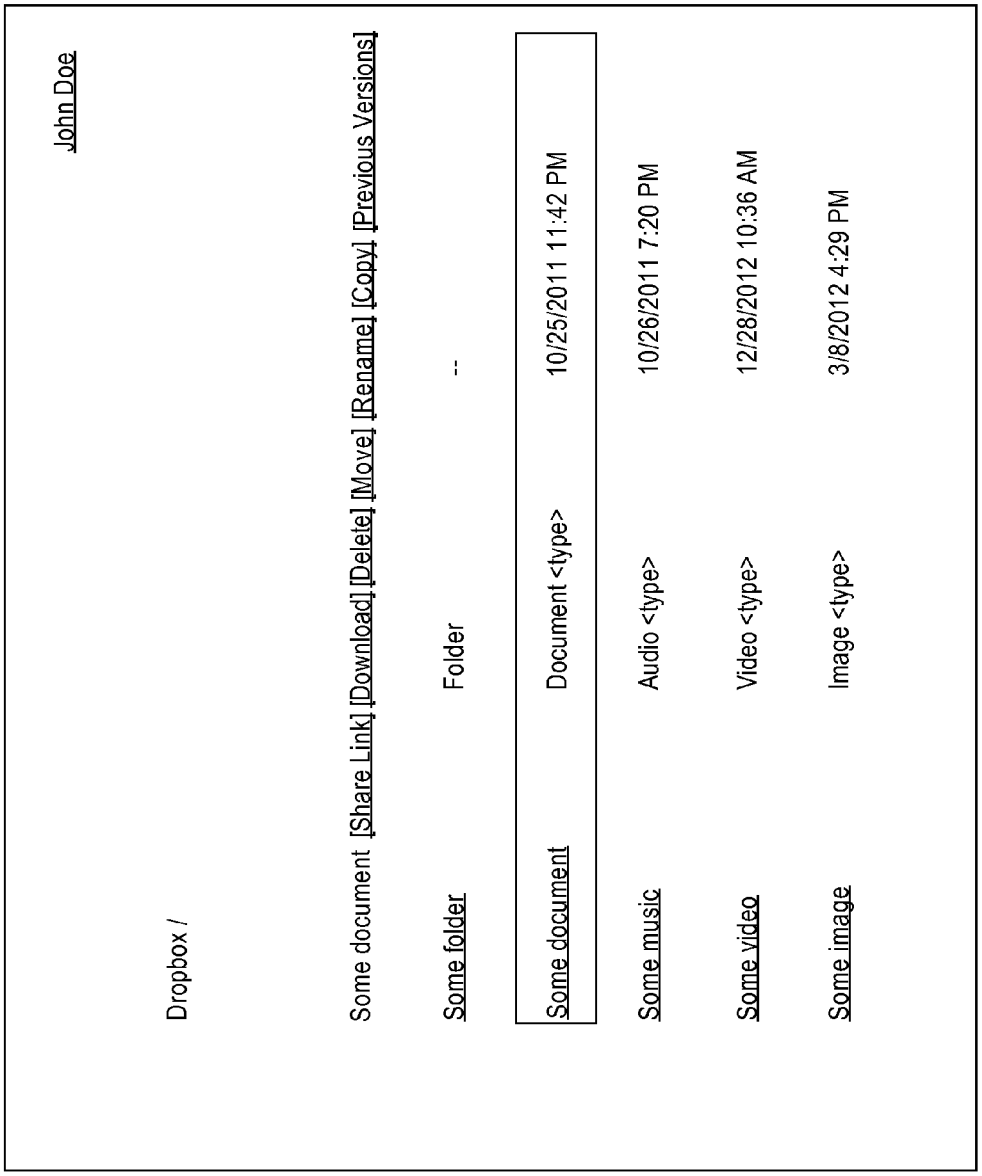
FIG. 5 is a diagram illustrating a content item browser page when a file content item is selected for further action.

FIG. 5 is a diagram illustrating the Content Item Browser page when a listed file content item is selected for further action by the Authenticated User. Similar to selecting a listed folder, the available actions can be displayed on the Content Item Browser page in response to selection of a listed file. The set of available actions displayed may vary between files and folder and between different types of files. As shown, one of the available actions for a selected file can also be an action to share the selected file with a shareable link generated by the system.

Sharing a Selected Content Item as a Sharable Link—Individual User

Figure 6:
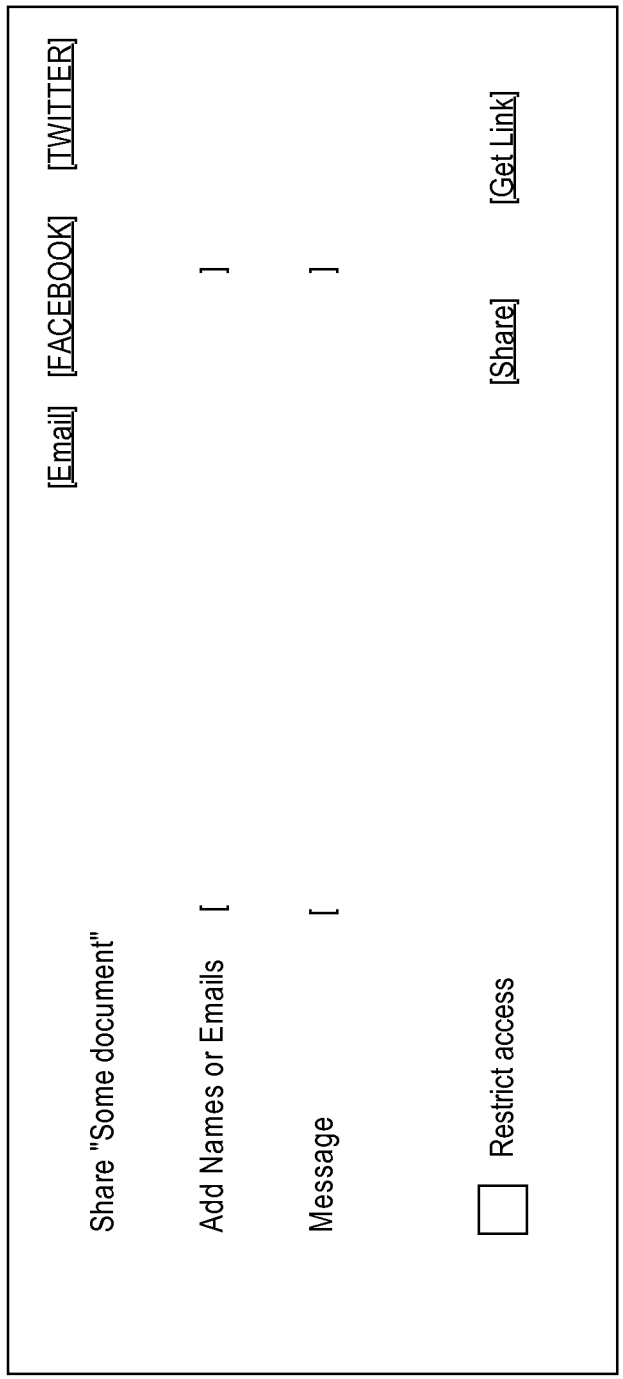
FIG. 6 is a diagram illustrating a form for sharing a content item as a sharable link.

Once a file or folder is selected for further action in the Content Item Browser, the Authenticated User can perform a "Share Link" action on the selected content item. FIG. 6 is a diagram illustrating a share link form displayed after an Individual User (a Link Sharer) selects a content item for sharing as a sharable link. The form provides a field for entering the names or email addresses of one or more Link Recipients. If a name is entered, the system can look up an e-mail address associated with the name in a contact list associated with the Link Sharer's account. The Link Recipients can be Authenticated Users and/or Public Users.

The form also provides a message field for entering a text message. The text message is sent to the Link Recipients in the notification of the sharable link. Such notification can be made by the system by e-mail message or by text message (e.g., SMS message), as just two examples.

The form provides a checkbox which the Link Sharer can select to restrict access on use of the sharable link for access to the content item. If the checkbox is not checked when the Link Sharer activates the "Share" button on the form, then the system can send notifications to the specified Link Recipients. The notifications include the sharable link generated by the system and any message entered by the Link Sharer into the "Message" field of the form. In the case where the restrict access checkbox is not checked, all Link Submitters of the sharable link including those Authenticated Users and Public User not specified as Link Recipients have the same access to the content item. That same access can be some default level of access of the system or a default level of access previously configured by the Link Sharer (e.g., through a user settings or configuration page). An example default level of access can be, for example, only preview access such that all Link Submitters are able to view only a preview of the content item provided by the system. Another example default level of access can be, for example, view and download such that all Link Submitters are able to view the content item and download a copy of the content item. As an extra security precaution, upon activating the "Share" button when the restrict access checkbox is not checked, the system can remind the Link Sharer of the default level of access and prompt the Link Sharer to confirm the sharing request before sending the notifications to the Link Recipients.

If, on the other hand, the restrict access checkbox is checked when the user activates the "Share" button, then notifications can be sent to the Link Recipients as described above when the checkbox is not checked. In addition, the form may expand to allow the Link Sharer to specify restrictions on use of the sharable link for access to the shared content item before activating the "Share" button.

As shown in FIG. 7, the Link Sharer can specify restrictions for Authenticated Users that are specified as Link Recipients in the Add Names or Emails field. In addition, the Link Sharer can also specify separate restrictions for everyone else. Everyone else includes all Authenticated Users not specified as Link Recipients and all Public Users. If a specified Link Recipient does not have an account with the system, the notification sent to the specified Link Recipient containing the sharable link can prompt the Link Recipient to create an account with the system to gain access to the content item.

Some possible use restrictions on a sharable link generated by the system for a content item and submitted to the system by a Link Submitter are:

A restriction on the type of access to the content item;
A restriction on when the content item can be accessed;
A restriction on how often (how many times) the Link Submitter can use the sharable link can to access the content item;
A restriction on the level of authentication required to access the content item; and
A restriction on the location of the Link Submitter.

Type of Access Restrictions

Type of access restrictions includes "None", "Preview Only", "View Only", and "View and Download".

If "None" is specified, then no access to content item is permitted using the sharable link. The "None" option may be available only for restricting access to everyone else.

With the "Preview Only" option, the system will generate a preview of the content item for the Link Submitter. The preview generated can vary depending on the type of the content item. For example, the preview of a video content item may be small clip of the video or video summary. The preview of a document may be some but not all pages of the document. The "Preview Only" may not available only when sharing file content items and not available when sharing folder content items.

The "View Only" option allows the Link Submitter to view the content item in Link Submitter's web browser but not download a copy of the content item. If the content item is a folder, the contents of the folder can be presented for viewing. For example, the content items in the folder can be presented in a file-folder hierarchy view. If the content item is a file, then the content item can be presented for viewing in the Link Submitter's web browser according to the type of the content item. For example, if the content item is a video, then the video is played in the web browser. If the content item is an image, then the image is shown in the web browser.

The "View and Download" option allows the Link Submitter to view the content item in the web browser and download a copy of the content item to the Link Submitter's personal computer.

Temporal Restrictions

In addition to or instead of type of access restrictions, the Link Sharer can specify a period of time or one or more period of times during which the sharable link can be used to access the content item. If the sharable link is submitted to the system outside the specified period of times, then no access is permitted. If a period of time or one or more period of times is specified, then access is permitted only if the sharable link is submitted to the system during one of the period of times. The Link Sharer can specify a single period of time, a periodic, recurring, or repeating period of time, or multiple period of times.

Count Restrictions

In addition to or instead of type of access and temporal restrictions, a count restriction on how many times a particular Link Submitter can access the content item using the sharable link may be specified by the Link Sharer. If the Link Submitter is an Authenticated User, then the system can track how many times the Link Submitter has accessed the content item based on the Authenticated User's identity. If the Link Submitter is a Public User, the system can track how many times the Link Submitter has accessed the content item based on peer network address (e.g., peer IP address). One access can be counted each time the Link Submitter submits the sharable link to the system for access to the content item. Alternatively, one access can be counted per session (e.g., per web browser session) in which the Link Submitter submits the sharable link to the system for access to the content item. Under the per session counting approach, submitting the sharable link to view the content and submitting the sharable link to download the content in a single session can count as only one access. Once the Link Submitter exceeds the allowed number of accesses, the Link Submitter can no longer access the content item using the sharable link.

Multi-Factor Authentication

In addition to or instead of type of access, temporal, and count restrictions, the Link Sharer can force multi-factor authentication before access to the content item using the sharable link is allowed by the system. In some embodiments, multi-factor authentication requires the user to provide two pieces of knowledge to the system (e.g., a password and a pin code). However, in other embodiments, multi-factor authentication involves two or more of the following factors:

something the user knows (e.g., a password, a PIN code, a pattern, etc.);
something the user has physical possession (e.g., a card, an authentication token, etc.); or
something the user is (e.g., a biometric characteristic, a fingerprint, an eye print, etc.)

In some embodiments, the first authentication factor is successfully logging into an account held by the system, where the account corresponds to one of the Authenticated Users specified by the Link Sharer as permitted to access the content item using the sharable link. In other words, the Link Submitter is an Authenticated User authorized by the Link Sharer to access to the content using the sharable link and with multi-factor authentication.

In some embodiments, the second authentication factor is successfully responding to an access challenge the system presents to the authorized Authenticated User when the authorized Authenticated User submits the sharable link to the system. A response to the challenge can be a password or pin code, for example. Here, on first attempted access to content item using the sharable link, the authorized Authenticated User is prompted to create a personal password or pin code that is used for subsequent attempts to access the content item using the sharable link. When that authorized Authenticated User submits the sharable link for subsequent access to the content item, the system prompts (challenges) the authorized Authenticated User to enter the previously provided password or pin code. If the authorized Authenticated User provides the correct password or pin code, then the requested access to the content item is permitted, assuming there are no other restrictions on the sharable link preventing access. If, on the other hand, the authorized Authenticated User does not provide the correct password or pin code, then the requested access is refused. Forcing multi-factor authentication for sensitive content items can be useful to protect the sensitive information of the content items from unauthorized users.

Location Restrictions

In addition to or instead of type of access, temporal, and count restrictions and forcing multi-factor authentication, the Link Sharer can restrict access to the content using the sharable link to certain geographic locations. For example, the Link Sharer can restrict access to the content item from inside the United States. Such access can be enforced by the system based on geo-coding the Link Submitter's peer network address, using a geo-ip service for example.

Sharing the Link

Once the Link Sharer has specified the desired restrictions, the Link Sharer can activate the "Share" button on the form. The will cause the system to send notifications to the specified Link Recipients.

The "Get Link" button causes a copy of the sharable link to be copied to the clipboard of the Link Sharer's computer. The Link Sharer can then easily paste the sharable link into an e-mail or into the address bar of a web browser.

The form can also provide an "Email" button which when activated launches an e-mail application installed on the Link Sharer's computer for composing an e-mail message containing the sharable link.

The form can also provide a "FACEBOOK" button for sending the sharable link to FACEBOOK for further processing by FACEBOOK. Such further processing can include posting the sharable link on the Link Sharer's FACEBOOK WALL, for example.

The form can also provide a "TWITTER" button for sending the sharable link to TWITTER for further processing by TWITTER. Such further processing can include sending the sharable link in a TWEET under the Link Sharer's TWITTER account, for example.

Sharing a Selected Content Item as a Sharable Link—Team Member

Sharing a content item as a sharable link by a Team Member is similar to sharing a content item as a sharable link by an Individual User as described above. However, a Team can have a policy set by an Administrator of the Team (who can be one of the Team Members) which determines whether Team Members can share content items with users outside the Team (i.e., non-Team Members).

If Team Members are permitted to only share Team content items as sharable links with other Team Members, then the Link Sharer can select specific Team Member Link Recipients and restrictions for those selected Team Members. No other users including Team Members are permitted access to the Team content item using the sharable link. This is shown by example in FIG. 8.

If Team Members are permitted to share Team content items with anyone, then the Link Sharer can select specific Team Member Link Recipients and restrictions for those selected Team members. In addition, the Link Sharer can specify restrictions for everyone else. This is shown by example in FIG. 9.

Requesting Access to a Content Item

When a Link Submitter that is an Authenticated User submits a sharable link to the system, the Link Submitter may not be authorized to access the underlying content item based on restrictions configured by the Link Sharer. In this case, the unauthorized Authenticated User can be presented with a page informing that the requested access is not authorized. In addition, the page may contain controls allowing the unauthorized Authenticated User to message the Link Sharer to request access to the content item using the sharable link. In some usage scenarios, the Link Sharer can configure on a per-sharable link basis or globally whether the Link Sharer wants to allow unauthorized users to send requests for access.

An example of such an unauthorized access page is shown in FIG. 10, which is a diagram illustrating an access denied page displayed after an Authenticated User submits a sharable link to the system requesting access to the underlying content item and the requested access is not authorized according to restrictions specified by the Link Sharer. If the Link Submitter activates the "Yes" button, then the system notifies the Link Sharer that the Authenticated User is requesting access to the content via the sharable link. Such notification can be made by e-mail or other appropriate notification mechanism.

Approving a Request for Access to a Content Item

FIG. 11 is a diagram illustrating an approval page that may be presented to the Link Sharer when an unauthorized Authenticated User requests access to a content item at a sharable link. The page identifies the Authenticated User requesting access. The page also prompts the Link Sharer to approve or disapprove the Authenticated User's request for access. If approved, the Authenticated user is added to the list of Authenticated User's approved by the Link Sharer to access to the content item using the sharable link. The approval page also includes a "shared link" hyperlink which, when activated by the Link Sharer, presents the current restrictions on the sharable link in a modifiable form.

FIG. 12 is a diagram illustrating a form presented to the Link Sharer for modifying the use restrictions on a sharable link for a content item that an unauthorized Authenticated User has requested access to. The modification form can be presented to the Link Sharer in response to activating the "sharable link" link on the approval form. The modification form allows the Link Sharer to confirm or modify the restrictions on the sharable link before approving the unauthorized Authenticated User to access the content item.

Returning to FIG. 11, if the Link Sharer activates the "Yes" button approving the requested access, then, as mentioned, the requesting Authenticated User is added to the list of authorized Authenticated Users for the sharable link. In addition, the system sends a notification to the requesting Authenticated User informing that the requested access has been approved by the Link Sharer. Such notification can be made by e-mail, text message, or by other means.

Modifying and Deleting Existing Sharable Links

FIG. 13 is a diagram illustrating a page for managing sharable links that a Link Sharer has previously shared. The sharable links are listed in table format. Each sharable link is identified by the name of the underling content item and time and date the sharable link was created. In addition, if the sharable link was created with restrictions, then the Link Sharer can activate the corresponding "Edit Restrictions" button to modify the current use restrictions associated with the sharable link. If the sharable link does not currently have any associated use restrictions, then a "Restrict Access" button for adding restrictions to the sharable link may be displayed. Activating the "Edit Restrictions" button or the "Restrict Access" button for a sharable link can take the Link Sharer to a page similar to that shown in FIG. 12. A created sharable link can also be deleted by activating the corresponding "Delete" button. After deleting a sharable link, it can no longer be used to access to underlying content item.

Accessing a Content Item at a Sharable Link

Figure 14:
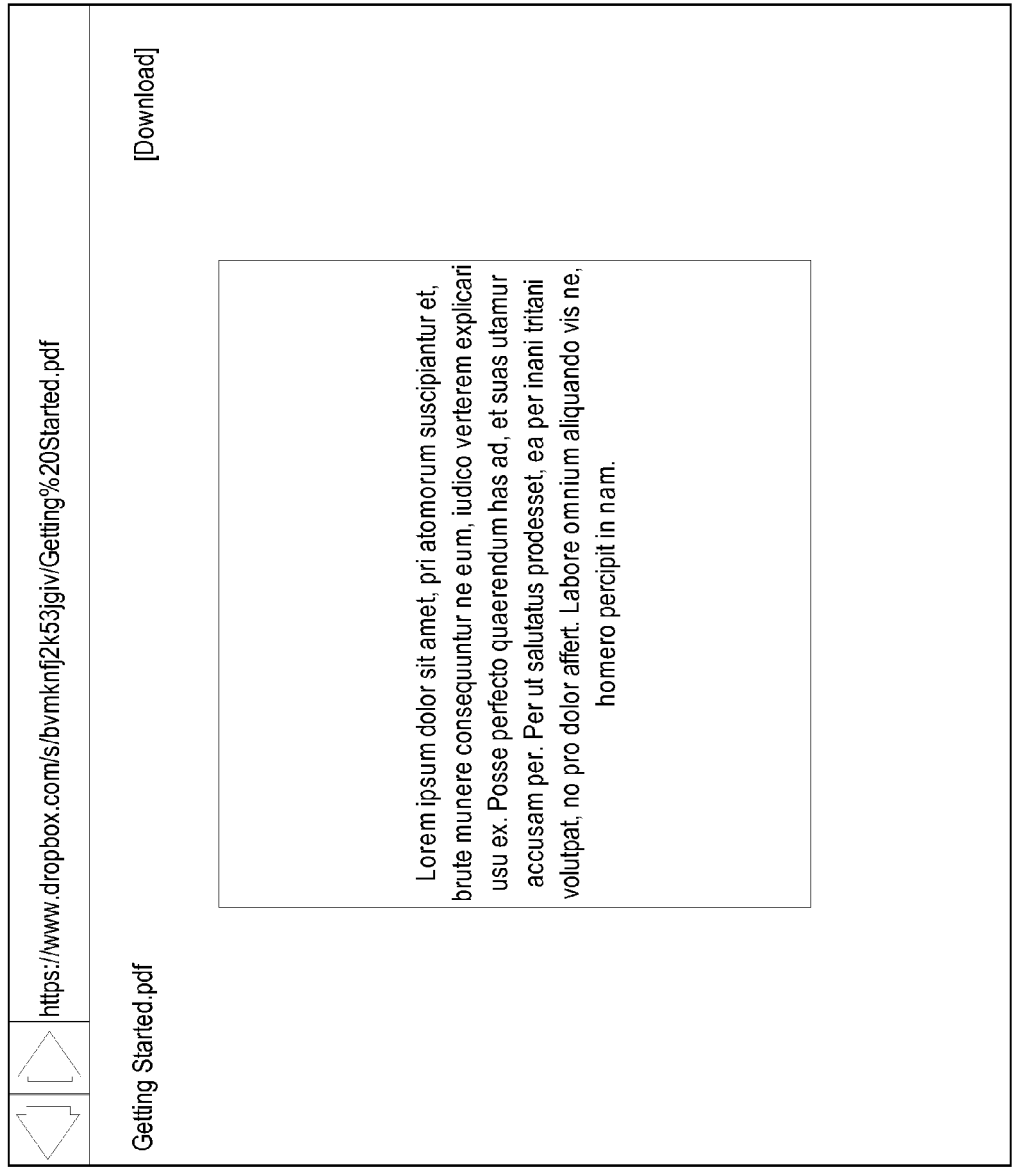
FIG. 14 is a diagram illustrating a page displayed in a web browser window of a Link Submitter that submits a sharable link to the system and for which the Link Submitter is authorized to use the sharable link to view and download an underlying content item.

FIG. 14 is a diagram illustrating a page displayed in a web browser window of a Link Submitter that submits a sharable link to the system that the Link Submitter has view and download access to. Here, the underlying content item is a document named "Getting Started.pdf". Since the Link Submitter is not restricted from viewing the document, the system allows the Link Submitter to view the document in the web browser window. If the Link Submitter was restricted from viewing the document but was not restricted from viewing a preview of the document, then the system would allow the Link Submitter to view a preview of the document in the web browser window. If the Link Submitter was not permitted to view the document or view a preview of the document, then the system would not present a preview or present the document in the web browser window.

A "Download" button is displayed on the page because the Link Submitter is not restricted from downloading the underlying content item. If the Link Submitter was restricted from downloading the underlying content item, the "Download" button would not be displayed on the page. Activating the "Download" button can cause the web browser to send the sharable link to the system requesting that the system serve the underlying content item to the web browser. It should be noted that the link to download the content item can take a form different than the link to preview or view the content item. For example, the link to view the content item can be:
https://www.dropbox.com/s/bvmknfj2k53jgiv/
Getting%20Started.pdf While the link to download the content item can be:
https://dl.dropbox.com/s/bvmknfj2k53jgiv/
Getting%20Started.pdf?token_hash=AAHXSzLFd_V-nSc4_6UqlRSw9ZnHBbgrJoDobKJPBuwWg&dl=1

Both links are the same sharable link. Both links contain the same content item identifying information. In particular, both links contain the same pseudo-randomly generated token "bvmknfj2k53jgiv" and both links contain the same content item name "Getting Started.pdf". Accordingly, both links can be considered to be the same sharable link. More generally, all links submitted to the system by a Link Submitter requesting access to a content item where all of the links have the same content item identifying information can be the same sharable link even if the links are not identical in form.

The "Download" action, if available to the Link Submitter, causes a copy of the underlying content item to be downloaded to the Link Submitter's personal computer. Such copy can be compressed in a file archive (e.g., as a ZIP archive). If the underlying content item is a folder, the content items in the folder and all sub-folders can be downloaded as a compressed file archive that preserves the file-folder hierarchy relative to the folder.

Software Architecture

Figure 15:
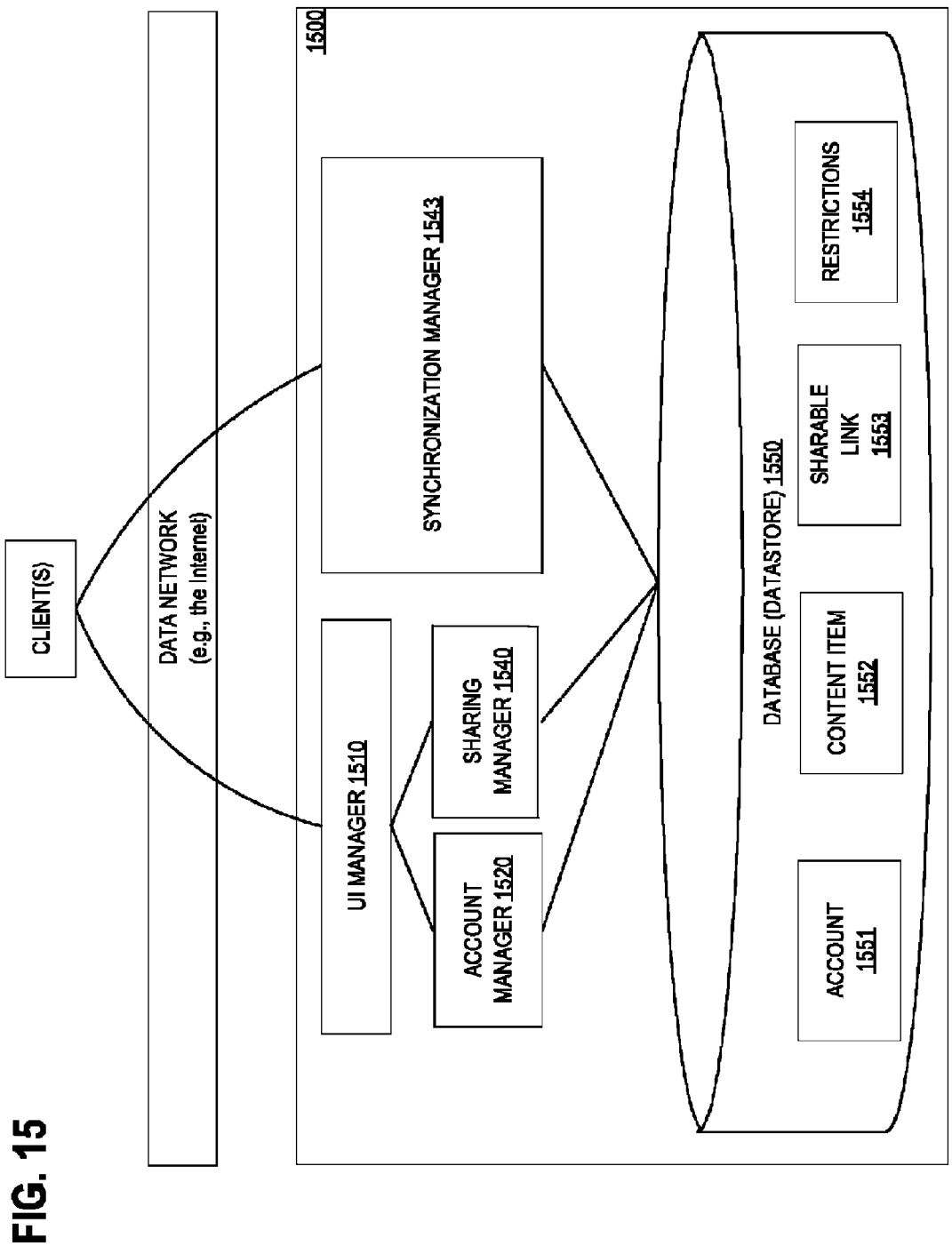
FIG. 15 a high-level diagram illustrating components that comprise the software architecture of a cross-platform content item sharing and synchronization system constructed in accordance with the present invention.

FIG. 15 is a high-level diagram illustrating components that comprise the software architecture of a cross-platform content item sharing and synchronization system 1500 constructed in accordance with the present invention. As shown, system 1500 comprises a user interface (UI) manager 1510, an account manager 1520, a content item synchronization manager 1530, a content item sharing manager 1540, and a database (data store) 1550. In typical deployment, the system 1500 is deployed on one or more servers (e.g., web servers), which can be accessed by end users via browser software or dedicated application software (e.g., operating on client personal computing devices). Each component of the system 1500 will next be described in turn.

The UI manager 1510 is a program module supporting the user interface for the system such as the exemplary user interfaces described above. Significantly, the user interface provides a cross-platform web application-based screen display with user input features (e.g., pull down menus, dialog boxes, buttons, and the like) that allow Authenticated Users to share and manage content items associated with their accounts and allow Authenticated Users and Public Users to access content items using sharable links.

In typical use, users access the user interface from web browser software (e.g., INTERNET EXPLORER, GOOGLE CHROME, SAFARI, FIREFOX, OPERA, etc.) installed on their client personal computing devices. However, the users may also access the user interface from dedicated client application software installed on the personal computer devices. The dedicated client application software can be provided by the system 1500 as downloadable software, for example. The client personal computing devices can be stationary computing devices (e.g., desktop and workstation computers), portable computing devices (e.g., laptop and tablet computers), set-top computing devices (e.g., game consoles and smart televisions), and mobile computing devices (e.g., mobile and smart phones). The client personal computing device run a variety of different operating system such as WINDOWS, MAX OS X, LINUX, IOS, ANDROID, and BLACKBERRY OS. Thus, the system 1500 supports a variety of different types of computing devices and operating systems.

Users can create accounts with the system using the account manager 1520 which is coupled to the UI manager 1510 for sending and receiving account data (e.g., account registration data, user preferences and settings data, etc.) to and from users.

After creating and successfully authenticated with an account (e.g., an Individual Account or Team Account), the user can designate a content item client repository on each of his or her client personal computing devices to associate with the account. For example, the content item repository can be an operating system folder of each of the client personal computing devices designated by the user. The synchronization manager 1530 replicate changes to content items in the client device repositories to ensure that each of the repositories eventually has the same set of content items. To do this, the synchronization manager 1530 can maintain a "hub" repository in the database 1550. The hub repository contains a copy of the set of content items associated with the account.

In operation, when a change to a content item of the set is made at one of the user's client personal computing devices (e.g., a content item is added, modified, or deleted), data representing the change is sent opportunistically by an agent installed on the client computing device to the synchronization manager 1530 over a data network (e.g., the Internet). For example, delta encoding or data differencing algorithms may be performed by the agent and synchronization manager 1530 to send a minimal amount of data over the data network that conveys the change made. Once received, the synchronization manager 1530 applies the change to the hub repository and opportunistically replicates the change to agents installed on the other of the user's client personal computing devices over the data network which apply the change to their local client repositories. If the account is a Team Account, the synchronization manager 1530 may also opportunistically replicate the change to the client personal computing devices of other Team Members. The synchronization manager 1530 can also replicate changes to agents on client computing devices when the hub repository is modified directly The synchronization manager 1530 allows the set of content items associated with an account to be recovered from the hub repository if a client repository is lost or destroyed (e.g., the client personal computing device containing the client repository is lost or destroyed). In addition, the synchronization manager 1530 facilitates a change anywhere ability where a change to a content item in any of the client repository or the hub repository associated with an account is eventually and opportunistically replicated to every other repository associated with the account.

The sharing manger 1540 allows Authenticated Users to share content items in the hub repositories associated with their accounts as sharable links. The sharing manager 1540 is coupled to the UI manager 1520 for receiving Authenticated Users' selection of content items to share and for receiving Authenticated Users' specification of restrictions on use of the sharable links for access to the content items.

In typical use, to share a content item 1552 as a sharable link 1553, a Link Sharer first logs-in to an account 1551. The content item 1552 can be a file or folder associated with the account 1551. The account 1551 can be an Individual Account or a Team Account.

After logging in to the account 1551, the Link Sharer selects the content item 1552 to share as the sharable link 1553. The Link Sharer can then specify one or more Link Recipients that will be sent notification of the sharable link 1553 (e.g., by e-mail message and/or text message). The Link Sharer can also restrict use of the sharable link 1553 for access to the content item 1552 or allow default restrictions to apply.

If the Link Sharer allows default restrictions to apply, then all Link Submitters of the sharable link 1553 have the same access to the content item 1552. For example, all Link Submitters may be able to see a preview of the content item in their web browsers.

If, on the other hand, the Link Sharer selects to restrict use of the sharable link 1553, then the Link Sharer can specify restrictions 1554 for the specified Link Recipients. The restrictions 1554 can include restrictions on what type of access to the content item 1552 it allows, when the sharable link 1553 can be used by the Link Recipients to access to the content item 1552, how many times the sharable link 1553 can be used by each Link Recipient to access the content item 1552, and/or, for Authenticated Users, a level of authentication required of the Link Recipients to access the content item 1552 using the sharable link 1553, among other possible restrictions.

If the account is an Individual Account, the Link Sharer can also specify similar separate restrictions 1554 for everyone else (i.e., Link Submitters who are not specified Link Recipients).

If the account is a Team Account, then the users the Link Sharer can specify restrictions 1554 for depend on whether Team Members are permitted to share content items of the Team to users outside the Team (i.e., with non-Team Members) or only to other Team Members. An Administrator of the Team (who may also be a Team Member) can configure a Team-wide setting on whether Team Members can share Team content items with users outside the Team. If Team Members are permitted to share Team content items outside the Team, then the Link Sharer can specify separate restrictions 1554 for Team Members specified as Link Recipients, Authenticated Users specified as Link Recipients, and everyone else. If, on the other hand, Team Members are not permitted to share Team content items as sharable links outside the Team, then the Link Sharer can specify restrictions 1554 for only Team Members specified as Link Recipients. In this case, all other users will not have access to the content item 1552 using the sharable link 1553.

After specifying any restrictions 1554, the sharing manager 1540 stores the restrictions 1540 in the database 1550 in associated with the sharable link 1553.

When a Link Submitter submits the sharable link 1553 to the system 1500 requesting access to the content item 1552, the sharing manager 1540 determines whether the requested access is permitted according to the restrictions 1554. The requested access can be to view a preview of the content item 1552, to view the content item 1552, to download the content 1552, edit the content 1552, as just some examples of possible requests for access.

If the requested access is permitted, then the sharing manager 1540 serves the requested access (e.g., generates a preview of the content 1552 if the requested access is to view a preview of the content item 1552).

If the requested access is not permitted and the Link Submitter is not an Authenticated User, then the sharing manager 1540 returns an access denied message to the Link Submitter.

If the requested access is not permitted and the Link Submitter is an Authenticated User (i.e., an Authenticated Link Submitter), then sharing manager 1540 returns an access denied message. In addition, the sharing system 1540 can prompt the Authenticated Link Submitter if he or she wants to request access to the content item 1552 from the Link Sharer. If the Authenticated Link Submitter selects to request access from the Link Sharer, then the sharing manager 1540 messages the Link Sharer (e.g., by e-mail, text message, or other messaging mechanism). The message informs the Link Sharer of the Authenticated Link Submitter than is requesting access, the content item 1552 the Authenticated Link Submitter is requesting access to, and the sharable link 1553 the Authenticated Link Submitter used to attempt to access the content item 1552. The message to the Link Sharer also allows the Link Sharer to approve or deny the request for access. If approved, the sharing manager 1540 modifies the restrictions 1554 to add the Authenticated Link Submitter to list of authorized Authenticated Users or list of Team Members, as appropriate. If the content item 1552 is associated with a Team account and Team Members are not allowed to share Team content items to non-Team Members, then the Authenticated Link Submitter may be required to be a Team Member to request access.

Extensions and Alternatives

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

Further, the sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for sharing a server-stored content item, comprising:
   receiving, from a client computing device used by a link sharer, configuration information specifying whether or not users that are not authorized to access a server-stored content item at a sharable link can request access from the link sharer to access the server-stored content item at the sharable link;
   storing the configuration information in association with the sharable link;
   receiving, from a client computing device used by a link submitter, a first request to access the server-stored content item at the sharable link;
   denying the access to the server-stored content item requested by the link submitter in the first request based on one or more use restrictions associated with the sharable link;
   determining, based on the configuration information associated with the sharable link, whether the link submitter can request access from the link sharer to access the server stored content item at the sharable link;
   based on determining that the link submitter can request access from the link sharer to access the server stored content item at the sharable link, prompting the link submitter to request approval to access to the server-stored content item at the sharable link;
   responsive to receiving approval from the link sharer for the link submitter to access the server-stored content item at the sharable link, modifying the use restrictions associated with the sharable link to allow the link submitter to access the server-stored content item at the sharable link;
   after the modifying the use restrictions, receiving, from a client computing device used by the link submitter, a second request to access the server-stored content item at the sharable link; and
   allowing the access to the server-stored content item requested by the link submitter in the second request based on the modified use restrictions associated with the sharable link;
   wherein the method is performed by one or more computing devices.

2. The method of claim 1, wherein the approval for the link submitter to access the server-stored content item at the sharable link is received from a link sharer that created the sharable link.

3. The method of claim 1, wherein the sharable link has the form of a Uniform Resource Locator (URL).

4. The method of claim 1, wherein the server-stored content item is one of a file or a folder.

5. The method of claim 1, wherein the use restrictions associated with the sharable link are modified to allow the link submitter to download the server-stored content item at the sharable link.

6. The method of claim 1, wherein the use restrictions associated with the sharable link are modified to allow the link submitter to view the server-stored content item at the sharable link.

7. The method of claim 1, wherein the use restrictions associated with the sharable link are modified to allow the link submitter to view a preview of the server-stored content item at the sharable link.

8. The method of claim 1, wherein the link submitter is prompted to request approval to access to the server-stored content item at the sharable link in response to the receiving the first request to access the server-stored content item at the sharable link and denying the access requested.

9. The method of claim 1, further comprising:
   prompting a link sharer to approve or disapprove the link submitter's request for approval to access the server-stored content item at the sharable link.

10. The method of claim 9, further comprising:
    allowing the link sharer to modify the use restrictions associated with the sharable link before approving the link submitter's request for approval to access the server-stored content item at the sharable link.

11. A system comprising:
    one or more computing devices configured with instructions which, when executed by the one or more computing devices, cause:
    receiving, from a client computing device used by a link sharer, configuration information specifying whether or not users that are not authorized to access a server-stored content item at a sharable link can request access from the link sharer to access the server-stored content item at the sharable link;
    storing the configuration information in association with the sharable link;
    receiving, from a client computing device used by a link submitter, a first request to access the server-stored content item at the sharable link;
    denying the access to the server-stored content item requested by the link submitter in the first request based on one or more use restrictions associated with the sharable link;
    determining, based on the configuration information associated with the sharable link, whether the link submitter can request access from the link sharer to access the server stored content item at the sharable link;
    based on determining that the link submitter can request access from the link sharer to access the server stored content item at the sharable link, prompting the link submitter to request approval to access to the server-stored content item at the sharable link;
    responsive to receiving approval from the link sharer for the link submitter to access the server-stored content item at the sharable link, modifying the use restrictions associated with the sharable link to allow the link submitter to access the server-stored content item at the sharable link;

after the modifying the use restrictions, receiving, from a client computing device used by the link submitter, a second request to access the server-stored content item at the sharable link; and allowing the access to the server-stored content item requested by the link submitter in the second request based on the modified use restrictions associated with the sharable link.

12. The system of claim 11, wherein the approval for the link submitter to access the server-stored content item at the sharable link is received from a link sharer that created the sharable link.

13. The system of claim 11, wherein the sharable link has the form of a Uniform Resource Locator (URL).

14. The system of claim 11, wherein the server-stored content item is one of a file or a folder.

15. The system of claim 11, wherein the use restrictions associated with the sharable link are modified to allow the link submitter to download the server-stored content item at the sharable link.

16. The system of claim 11, wherein the use restrictions associated with the sharable link are modified to allow the link submitter to view the server-stored content item at the sharable link.

17. The system of claim 11, wherein the use restrictions associated with the sharable link are modified to allow the link submitter to view a preview of the server-stored content item at the sharable link.

18. The system of claim 11, wherein the link submitter is prompted to request approval to access to the server-stored content item at the sharable link in response to the receiving the first request to access the server-stored content item at the sharable link and denying the access requested.

19. The system of claim 11, wherein the instructions, when executed by the one or more computing devices, further cause:

prompting a link sharer to approve or disapprove the link submitter's request for approval to access the server-stored content item at the sharable link.

20. The system of claim 19, wherein the instructions, when executed by the one or more computing devices, further cause:

allowing the link sharer to modify the use restrictions associated with the sharable link before approving the link submitter's request for approval to access the server-stored content item at the sharable link.

* * * * *